United States Patent
Bertin et al.

(10) Patent No.: US 11,722,955 B2
(45) Date of Patent: Aug. 8, 2023

(54) METHOD FOR MANAGING AN ATTACHMENT OF A COMMUNICATION DEVICE TO AN OPERATOR NETWORK

(71) Applicant: ORANGE, Issy-les-Moulineaux (FR)

(72) Inventors: Emmanuel Bertin, Chatillon (FR); Stephane Tuffin, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 37 days.

(21) Appl. No.: 17/259,772

(22) PCT Filed: Jul. 10, 2019

(86) PCT No.: PCT/FR2019/051736
§ 371 (c)(1),
(2) Date: Jan. 12, 2021

(87) PCT Pub. No.: WO2020/016504
PCT Pub. Date: Jan. 23, 2020

(65) Prior Publication Data
US 2021/0329544 A1    Oct. 21, 2021

(30) Foreign Application Priority Data
Jul. 19, 2018  (FR) ...................................... 1856721

(51) Int. Cl.
*H04W 48/18* (2009.01)
*H04W 76/10* (2018.01)
(Continued)

(52) U.S. Cl.
CPC ......... *H04W 48/18* (2013.01); *H04W 12/088* (2021.01); *H04W 48/16* (2013.01);
(Continued)

(58) Field of Classification Search
CPC ..... H04W 76/10; H04W 48/16; H04W 48/18; H04W 12/088; H04W 88/10; H04W 88/16; H04W 12/06; H04W 76/11
See application file for complete search history.

(56) References Cited

U.S. PATENT DOCUMENTS

2018/0332442 A1* 11/2018 Shaw .................... H04W 36/26

OTHER PUBLICATIONS

International Search Report dated Aug. 20, 2019 for corresponding International Application No. PCT/FR2019/051736, filed Jul. 10, 2019.
(Continued)

*Primary Examiner* — Diane D Mizrahi
(74) *Attorney, Agent, or Firm* — David D. Brush; Westman, Champlin & Koehler, P.A.

(57) ABSTRACT

A management method that allows a communication device to benefit from a network connectivity provided by a third party via the operator network. The method includes: receiving, from the communication device, a request for attachment to the operator network and an identifier of the third party; obtaining, using the identifier of the third party, contact information of a software control gateway instantiated for controlling access to a network slice allocated by the operator to the third party, this contact information including a reachability address of the software control gateway or an identifier of the network slice allocated to the third party and access to which is controlled by the software control gateway; and sending a message to the device containing the contact information and inviting the communication device to attach to the software control gateway using this contact information.

9 Claims, 2 Drawing Sheets

(51) Int. Cl.
  *H04W 12/088* (2021.01)
  *H04W 48/16* (2009.01)
  *H04W 88/10* (2009.01)
  *H04W 88/16* (2009.01)
(52) U.S. Cl.
  CPC ........... *H04W 76/10* (2018.02); *H04W 88/10* (2013.01); *H04W 88/16* (2013.01)

(56) References Cited

OTHER PUBLICATIONS

Written Opinion of the International Searching Authority dated Aug. 20, 2019 for corresponding International Application No. PCT/FR2019/051736, filed Jul. 10, 2019.

French Search Report dated Apr. 11, 2019 for corresponding French Application No. 1856721, filed Jul. 19, 2018.

"3rd Generation Partnership Project; Technical Specification Group Services and System Aspects; Study on the Security Aspects of the Next Generation System (Release 14)", 3GPP Standard; Technical Report; 3GPP TR 33.899, 3rd Generation Partnership Project (3GPP), Mobile Competence Centre; 650, Route des Lucioles; F-06921 Sophia-Antipolis Cedex; France, vol. SA WG3, No. V1.3.0, Aug. 21, 2017 (Aug. 21, 2017), pp. 1-605, XP051450230.

"5G End-To-End Architecture Framework V2.0", 3GPP Draft; 180226 NGMN_E2EARCHFRAMEWORK_v2.0.0, 3rd Generation Partnership Project (3GPP), Mobile Competence Centre; 650, Route Des Lucioles; F-06921 Sophia-Antipolis Cedex; France, Apr. 30, 2018 (Apr. 30, 2018), XP051449703.

"3rd Generation Partnership Project; Technical Specification Group Core Network and Terminals; 5G System—Phase 1; CT WG4 Aspects (Release 15)", 3GPP Draft; 29891-F00, 3rd Generation Partnership (3GPP), Mobile Competence Centre; 650, Route Des Lucioles; F-06921 Sophia-Antipolis Cedex; France, Jan. 29, 2018 (Jan. 29, 2018), XP051384057.

"3rd Generation Partnership Project; Technical Specification Group Services and System Aspects; Telecommunication Management; Study on Management and Orchestration of Network Slicing for Next Generation Network (Release 14)", 3GPP Draft; Updated 28.801-100, 3rd Generation Partnership Project (3GPP), Mobile Competence Centre; 650, Route Des Lucioles; F-06921 Sophia-Antipolis Cedex; France, Apr. 3, 2017 (Apr. 3, 2017), XP051259205.

"3rd Generation Partnership Project; Technical Specification Group Services and System Aspects; Study on Architecture for Next Generation System (Release 14)", 3GPP Standard; Technical Report; 3gPP TR 23.799, 3rd Generation Partnership Project (3GPP), Mobile Competence Centre; 650, Route Des Lucioles; F-06921 Sophia-Antipolis Cedex; France, vol. SA WG2, No. V14.0.0, Dec. 16, 2016 (Dec. 16, 2016), pp. 1-527, XP051295448.

English translation of the Written Opinion of the International Searching Authority dated Aug. 27, 2019 for corresponding International Application No. PCT/FR2019/051736, filed Jul. 10, 2019.

* cited by examiner

METHOD FOR MANAGING AN ATTACHMENT OF A COMMUNICATION DEVICE TO AN OPERATOR NETWORK

CROSS-REFERENCE TO RELATED APPLICATIONS

This Application is a Section 371 National Stage Application of International Application No. PCT/FR2019/051736, filed Jul. 10, 2010, the content of which is incorporated herein by reference in its entirety, and published as WO 2020/016504 on Jan. 23, 2020, not in English.

BACKGROUND OF THE INVENTION

The invention pertains to the general field of telecommunications.

It relates more particularly to the control of access to an operator network when communication devices benefit from a network connectivity offered via this network but provided by a third party separate from the network operator.

The invention thus applies in a privileged but non-limiting manner to connected objects (regardless of the nature of these objects, for example a digital tablet, a connected bulb, a connected vehicle, a sensor, etc.) embedding a network connectivity which is not offered directly by the network operator supporting this connectivity but by a third party.

With fifth generation telecommunication networks (5G), and the advent of Network Function Virtualization (or NFV), the infrastructure for hosting these network functions (from radio functions to routing functions) are intended to take the form of standard computer infrastructures, capable of hosting any virtualized network function in the form of computer code executable on a standard operating system. More specifically, the focus is on hosting infrastructures dedicated to the execution of centralized network functions in centralized datacenters, while infrastructures dedicated to the execution of peripheral functions of the network (such as for example radio base station functions) are intended to be hosted by smaller proximity datacenters, as proposed in particular in the work carried out by ETSI on the "Multi-access Edge Computing" (or MEC) described on the web page http://www.etsi.org/technologies-clusters/technologies/multi-access-edge-computing.

In this context of virtualization, currently telecommunication networks are also increasingly opening to third parties, that is to say to parties other than the operators of these networks. In new 5G network architectures, it is thus considered to dedicate network "slices" to one or more third parties, each network slice meeting specific quality of service requirements required by the third party (throughput, latency, reliability, etc.). A network slice designates a set of resources, including network functions and hardware infrastructures hosting these network functions, which when combined in an appropriate manner, allow to create a network medium meeting given quality and performance requirements.

Slicing a network thus allows to manage and operate multiple virtual networks on a common physical network infrastructure. Thus, for example, an automobile manufacturer can benefit from a 5G network slice for the communication needs of his vehicles while an industrialist specializing in lighting can benefit from another 5G network slice for communication needs of his connected bulbs, each of these parties having very different and specific constraints and technical needs. These network slices are based on virtual functions instantiated in the operator network, which are virtually sealed from one another, although they rely on the same physical resources of the operator network (in terms of equipment but also of spectrum, etc.).

Even if the various network slices can be designed to activate or, on the contrary, deactivate some network functions according to the needs of the third parties to which they are allocated, other functions nevertheless remain shared between these network slices, and are implemented "outside" the network slices (that is to say before the selection of the actual network slices) in the current retained version of the architecture of 5G telecommunication networks ("Phase 1"). Thus, for example, the access authentication and control which are specific to each access network are carried out during the attachment of the devices to the operator network upstream of the selection of the network slices associated with these devices. In other words, it is only once the authentication of a device having subscribed to a network connectivity with a third party has been validly carried out that the selection of the network slice associated with this third party is operated.

It is therefore understandable that since third parties may have very different and specific needs, such an architecture is not necessarily well adapted and in any event lacks flexibility.

OBJECT AND SUMMARY OF THE INVENTION

The invention allows in particular to overcome this drawback by proposing a method for managing an attachment of a communication device to an operator network, in order to benefit from a network connectivity provided by a third party via the operator network, said method comprising:

a step of receiving, from the communication device, a request for attachment to the operator network and an identifier of the third party;

a step of obtaining, using the identifier of the third party, contact information of a software control gateway instantiated for controlling access to a network slice allocated by the operator to the third party, this contact information comprising a reachability address of the software control gateway or an identifier of the network slice allocated to the third party and access to which is controlled by the software control gateway; and a step of sending a message to the device containing the contact information and inviting the communication device to attach to the software control gateway using this contact information.

Correspondingly, the invention also aims at a software network entity, instantiated to manage the attachment of at least one communication device to an operator network in order to benefit from a network connectivity provided by a third party via the operator network, this software network entity comprising:

a reception module, able to receive from said communication device a request for attachment to the operator network and an identifier of the third party;

an obtaining module, configured to obtain, using the identifier of the third party, a contact information from a software control gateway instantiated for controlling access to a network slice allocated by the operator to the third party, this contact information comprising a reachability address of the software control gateway or an identifier of the network slice allocated by the operator to the third party and access to which is controlled by the software control gateway; and a sending module, configured to send a message to the communication device containing the contact information and inviting the device to attach to the software control gateway using this contact information.

The invention also relates to a computer system comprising:

- a software network entity, according to the invention, instantiated to manage the attachment of at least one communication device to the operator network in order to benefit from a network connectivity provided by the third party via the operator network; and
- a software control gateway instantiated for controlling access to a slice of the operator network allocated to the third party.

No limitation is attached to the nature of the computer system according to the invention. It can be a server or any other device equipped with computer and network resources, such as for example a datacenter.

According to another aspect, the invention also relates to a method for access, by a communication device, to a network connectivity provided by a third party via an operator network, this method comprising:

- a step of requesting attachment to the operator network comprising the provision of a third-party identifier;
- a step of receiving a message containing contact information of a software control gateway instantiated for controlling access to a network slice allocated by the operator to the third party, this contact information comprising a reachability address of the software control gateway or an identifier of the network slice access to which is controlled by the software control gateway, said message inviting the communication device to attach to the software control gateway;
- a step of requesting an attachment to the software control gateway using the contact information; and
- a step of accessing by the communication device to a network connectivity via the slice of the operator network allocated to the third party.

Correspondingly, it also relates to a communication device comprising:

- a first request module, configured to request an attachment to an operator network in order to benefit from a network connectivity provided by a third party via the operator network, said request module being configured to provide an identifier of the third party;
- a reception module, capable of receiving a message containing contact information from a software control gateway instantiated for controlling access to a network slice allocated by the operator to the third party, this contact information comprising a reachability address of the software control gateway or an identifier of the network slice access to which is controlled by the software control gateway, said message inviting the device to attach to the software control gateway;
- a second request module, configured to request an attachment to the software control gateway using the contact information; and
- an activated access module, configured to access the operator network slice and provide the communication device with network connectivity via said operator network slice allocated to the third party.

No limitation is attached to the nature of the communication device to which the invention applies. It can be any type of object with means of communication via a network (regardless of this network, for example wireless, mobile, short range, etc.), such as for example a connected object (for example IoT object such as a connected bulb, a connected vehicle, etc.), a digital tablet, a phone, etc.

Thus, the invention proposes to decouple the access control and the authentication of the communication devices benefiting from network connectivity offered by a third party via the operator network, from the network functions performed by the network operator. This approach allows to increase the flexibility of the operator network architecture in a context of opening this network to third parties, and offers third parties the possibility of adapting the access control implemented to their needs. Indeed, thanks to the invention, the policies and the access control and authentication mechanisms implemented are no longer imposed and limited by the access technology used by the communication devices to access the operator network but can be defined and selected by the third parties themselves, in collaboration with the network operator, according to their specific needs. In other words, the invention allows, in a context where communication devices embedding a network connectivity are managed by third parties distinct from the network operator, to offer these third parties the possibility of controlling the rules for accessing the network slice allocated to them.

The invention is advantageously based to this end on the instantiation of software access control gateways for each third party benefiting from a network slice in the operator network, to which the operator network returns the communication devices when they attempt to attach to the network in order to obtain a network connectivity. More specifically, each software access control gateway associated with a third party is instantiated to control the access to the network slice allocated to that third party. In accordance with the invention, the access control and the authentication of the communication devices are therefore performed after the selection of the network slices affected by the attachment requests of the communication devices in question. They can therefore be selected by the third party, which, thanks to the software control gateway which is dedicated thereto, can define its own authentication session (i.e. the criteria, algorithms, etc. retained for this authentication) without being dependent on the choices made in this regard by the network operator. The management method according to the invention is preferably implemented without prior authentication of the communication device with the operator network.

The invention is thus relatively simple to implement and particularly well adapted to the current context of opening telecommunication networks to third parties.

Furthermore, the use of software functions (software network entity and software control gateway) offers the third party the possibility of dynamically adapting and/or updating the access control policy that it wishes to apply to the communication devices for which it manages network connectivity. In particular, it can easily add access control mechanisms or modify the rules that are applied by these mechanisms, etc. The invention offers a great flexibility in the definition of access control, which does not require laborious intervention to add/delete/modify the implemented access control: a simple modification of the computer code executed by the software control gateway is sufficient.

In addition, these various software functions can be easily implemented by a computer system, which greatly simplifies the infrastructure on which the network architecture is based. As mentioned previously, in a particular embodiment, this computer system may be a datacenter, and the control gateway and the network entity may be functions executed by virtual machines (this is then referred to as a virtual control gateway and virtual network entity) relying on the computer resources and networks of this datacenter.

The selection of the network slice corresponding to the third party providing the communication device with the offer of network connectivity, and thus the gateway controlling access to this network slice, is enabled thanks to the identifier of the third party transmitted by the communication device to the operator network when requesting an attachment.

In a particular embodiment, the identifier of the third party is provided in the attachment request sent by the communication device to the network.

Thanks to this identifier, the network can easily identify to which software control gateway to direct the communication device to be attached.

No limitation is attached to the nature of this identifier: it can be a name, a code or any alphanumeric string, a cryptographic key (for example a public encryption key), etc. transmitted unencrypted or encrypted to the network when the communication device is attached.

Alternatively, the identifier of the third party may be provided by the communication device during an exchange set up between the network and the communication device as part of its attachment request. It may for example be the subject of a random challenge implemented from cryptographic material embedded in the communication device and provided by the third party to the operator network.

In a particular embodiment, the management method comprises:

a preliminary step of instantiating the software control gateway to execute a computer code implementing a function defined by the third party for controlling access to the network slice allocated by the operator to the third party; and a step of memorizing, in a database, an identifier of the third party in association with a reachability address (for example a URL for Uniform Resource Locator or a URI for Uniform Resource Identifier, or a pointer) of the instantiated software control gateway or with an identifier of the network slice allocated by the operator to the third party.

In this embodiment, the software control gateway carrying out the access control to the network slice allocated to the third party is instantiated prior to the reception of any attachment request from a communication device having subscribed to a network connectivity with the third party. The instantiation of the control gateway associated with the third party can be performed, for example, when the third party agrees with the network operator to benefit from a slice of the network to provide network connectivity to the communication devices that it manages. This allows to speed up the processing of attachment requests emitted by the communication devices managed by the third party.

In another embodiment, the software control gateway is instantiated dynamically, after receiving the attachment request from the communication device, to execute a computer code implementing a function defined by the third party for controlling access to the network slice allocated by the operator to the third party, this computer code being obtained by interrogating a library of software network functions by means of the identifier of the third party.

In particular, the software control gateway attached to a third party can be instantiated when the operator network receives the first request emanating from a communication device managed by the third party.

In a particular embodiment, the management method is implemented by a software network entity hosted in a datacenter called proximity datacenter, said proximity datacenter also hosting the software control gateway and an access point of an access network to which the communication device is connected and used by the communication device to access the operator network.

Such an access point is for example a base station, that is to say a node eNodeB for a 4G radio technology or a gNodeB for 5G radio technology. The software network entity and the software control gateway can then either be implemented autonomously or rely on some of the functions already performed by the access point.

Correspondingly, the datacenter according to the invention may comprise an access point of an access network to which the communication device is connected and used by the communication device to access the operator network.

The invention, in this embodiment, proposes an innovative approach defining a minimalist access network architecture capable of implementing the main functions of a network necessary to support the opening of this network to third parties without predefining the core network. This approach is based on a decoupling, hitherto little considered in the design of network architectures, but which allows to increase the flexibility of the entire architecture. This embodiment further greatly simplifies the architecture of the operator core network, relieving it of functions that are performed at the edge of the network at the access network.

Furthermore, the use of software functions allows, as mentioned above, to simplify the possible update of the access control carried out for each network slice.

In a particular embodiment, the various steps of the management method and/or of the access method are determined by computer program instructions.

Consequently, the invention also relates to a computer program on an information medium, this program being capable of being implemented in a software network entity, in a communication device or more generally in a computer, this program including instructions adapted to the implementation of the steps of a management method or of an access method as described above.

This program can use any programming language, and be in the form of source code, object code, or intermediate code between source code and object code, such as in a partially compiled form, or in any other desirable form.

The invention also relates to an information or recording medium readable by a computer, and including instructions of a computer program as mentioned above.

The information or recording medium can be any entity or device capable of storing the program. For example, the medium may include a storage means, such as a ROM, for example a CD ROM or a microelectronic circuit ROM, or else a magnetic recording means, for example a hard disk.

On the other hand, the information or recording medium can be a transmissible medium such as an electrical or optical signal, which can be conveyed via an electrical or optical cable, by radio or by other means. The program according to the invention can in particular be downloaded from an Internet type network.

Alternatively, the information or recording medium can be an integrated circuit in which the program is incorporated, the circuit being adapted to execute or to be used in the execution of the method in question.

The invention also relates to a communication system comprising:

a communication device according to the invention having subscribed to a network connectivity provided by a third party via an operator network slice;

a software network entity according to the invention instantiated to manage the attachment of the device to the operator network in order to benefit from said network connectivity; and a software control gateway instantiated for controlling access to the operator network slice allocated to the third party.

It is also possible to consider, in other embodiments, that the management method, the software network entity, the access method, the communication device and the system according to the invention have, in combination, all or part of the aforementioned features.

BRIEF DESCRIPTION OF THE DRAWINGS

Other features and advantages of the present invention will emerge from the description given below, with reference to the appended drawings which illustrate an exemplary embodiment thereof without any limiting nature. In the figures.

DETAILED DESCRIPTION OF THE INVENTION

Figure 1:
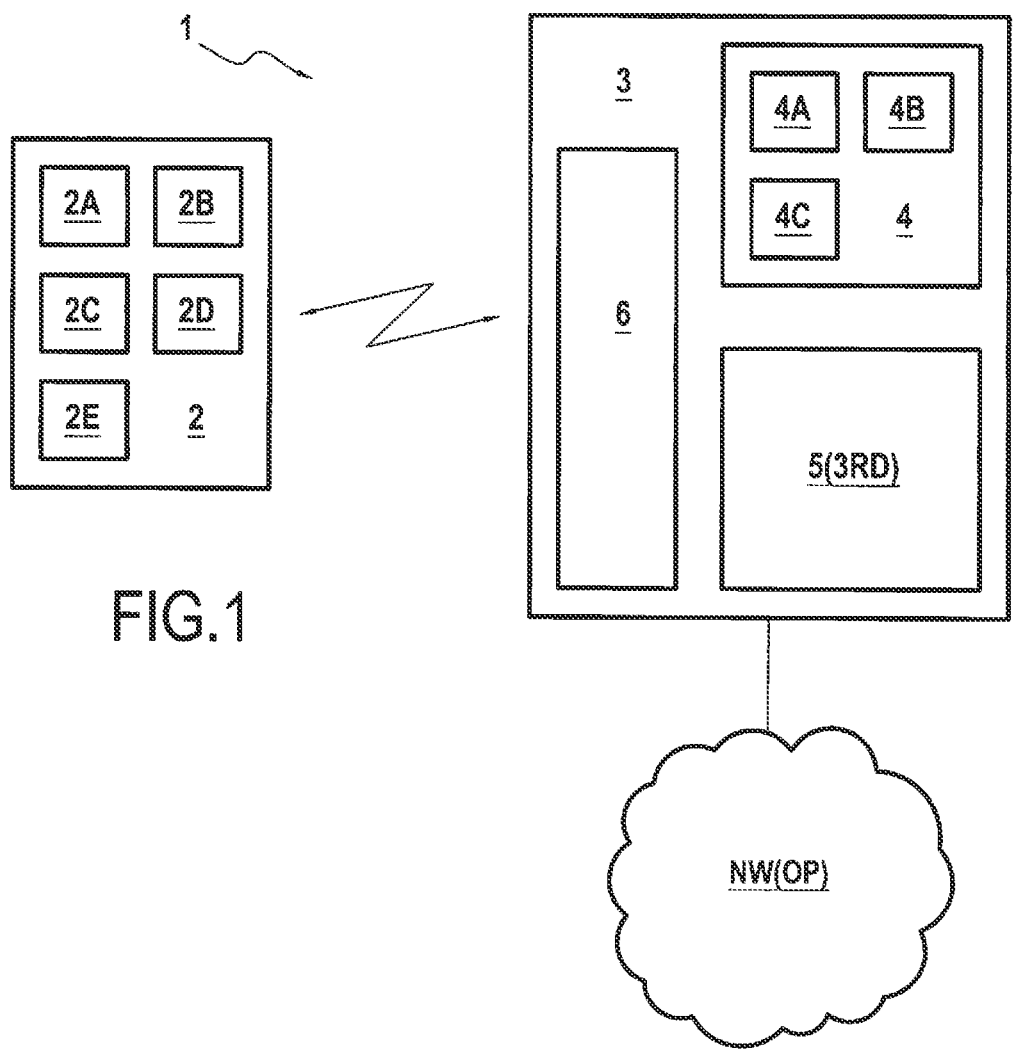
FIG. 1 schematically shows a communication system in accordance with the invention in a particular embodiment.

FIG. 1 shows, in its environment, a communication system 1 in accordance with the invention, in a particular embodiment in which it allows a communication device 2 to benefit from a network connectivity offered by a third party 3RD via an operator (OP) network NW. The network NW is for example here a 5G telecommunication network. However, this assumption is not limiting in itself, and other types of telecommunication networks can be considered, such as for example a wired communication network (fiber or ADSL).

Third party means here any party distinct from the network NW operator OP, having an agreement with the operator OP granting it a virtual slice of the network NW, denoted SLI(3RD), to which the communication devices managed by the third party can access in order to communicate with other devices and to benefit from a network connectivity, in other words access to all the resources of the third party connected to the same network slice, as well as possibly to other resources via the Internet network or via other virtual network slices. Such a third party is for example the manufacturer of the considered communication devices. As mentioned previously, a slice of a network designates a set of resources, including network functions and the hardware infrastructures hosting these network functions, which when combined in an appropriate manner, allow to create a network medium meeting given quality and performance requirements (in this case those defined by the third party 3RD).

No limitation is attached to the nature of the communication device 2. It can be any type of object communicating wirelessly, that is to say which embeds a network connectivity module to communicate with other devices, that is to say here, means (like a card, communication interface, etc.) for connecting to the network NW. Such a communicating object is for example a connected object such as a connected vehicle, a connected bulb, etc., a digital tablet, a telephone, etc. More particularly here the focus is on the case where the authentication software located in the network connectivity module embedded by the communication device 2 is designed by the third party 3RD and not by the network NW operator OP.

In accordance with the invention, the communication system 1 comprises a computer system 3 (comprising one or more computers) hosting a software network entity 4 in accordance with the invention, as well as a software control gateway 5(3RD) instantiated for the third party 3RD to control the access to the slice SLI(3RD) of the network NW allocated to the third party by the operator OP.

In the embodiment considered in FIG. 1, the computer system 3 is a datacenter called proximity datacenter, located at the periphery of the network NW, and more particularly at the radio access network used by the communication device 2 to access the network NW.

Furthermore, the software control gateway 5(3RD) and the software network entity 4 are here virtual functions executed by virtual machines of the datacenter 3. Such virtual functions, in a known manner, see an abstraction of the physical resources of the system on which they are hosted and do not run directly on these physical resources. Such an abstraction allows multiple virtual machines to share the physical resources of the system. However, it should be noted that this assumption is not limiting: the control gateway and the network entity are generally software functions regardless of whether or not a computer resource virtualization technology is used. Virtualization facilitates the implementation of such software functions but is not a prerequisite for the invention. Other technologies, such as for example the OSGi (Open Services Gateway initiative) technology, can alternatively be used to implement the invention and instantiate the control gateway and the software network entity.

More specifically, in the embodiment described herein, the datacenter 3 also integrates the hardware elements (for example computer servers; digital links to the radio antennas) and the software functions conventionally included in an access point of the access network (denoted globally by the reference 6), also more commonly referred to as Base Band Unit (BBU) in the context of cellular networks. No limitation is attached to the radio access technology implemented strictly speaking by the access point 6 (to communicate in particular with the communication device 2): it may be a cellular access technology, WiFi, etc.

Note that in the example considered in FIG. 1, the access point 6 and the software network entity 4 are represented as autonomous entities. However, in an alternative embodiment, the software network entity 4 according to the invention can be implemented by reusing some of the functions implemented by the access point 6, supplemented by additional computer code instructions in order to fulfill its function of software network entity in accordance with the invention.

Figure 2:
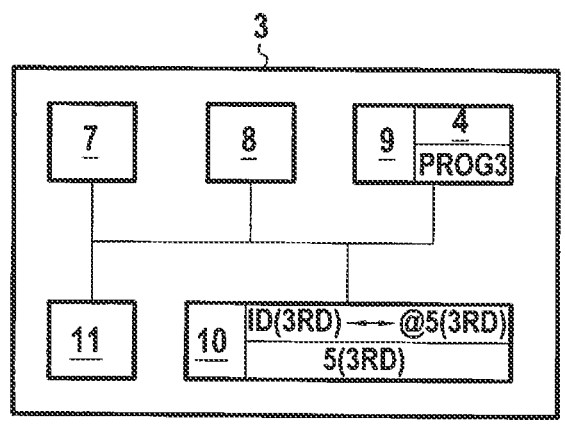
FIGS. 2 and 3 show the hardware architecture of a datacenter and a communication device in accordance with the invention in a particular embodiment.

In the embodiment described herein, the datacenter 3 has the hardware architecture of a computer as illustrated in FIG. 2.

It comprises in particular a processor 7, a random access memory 8, a read only memory 9, a mass memory 10 (for example a non-volatile flash memory, hard disk, etc.), as well as communication means 11 allowing it to communicate with the pieces of equipment of the network NW and with the communication device 2 via the access point 6.

In the embodiment described herein, the read only memory 9 of the datacenter 3 contains the computer code executed by the software network entity 4 according to the invention. The read only memory 9 constitutes a recording medium in accordance with the invention, readable by the processor 7 and on which is recorded a computer program PROG3 in accordance with the invention, including instructions for the execution of the steps of the management method according to the invention. It is assumed here that the instantiated access control gateways for each third party (and in particular the gateway 5(3RD)) are software functions memorized in the mass memory 10 of the datacenter 3.

The computer program PROG3 here defines functional and software modules of the software network entity 4 which use or rely on the previously mentioned hardware elements 7-11 of the datacenter 3. These modules comprise in particular, as illustrated in FIG. 1:

a reception module 4A, capable of receiving, from a communication device such as the communication device 2, a request for attachment to the network NW of the operator OP and an identifier ID(3RD) of the third party 3RD managing the network connectivity of the communication device 2. No limitation is attached to the nature of the identifier ID(3RD): it can be an alphanumeric string such as a code, or a cryptographic material such as a public encryption key allocated to the third party 3RD, etc.;

an obtaining module 4B, configured to obtain, using the identifier ID(3RD) of the third party 3RD, contact information from a software control gateway instantiated for controlling access to a network slice allocated by the operator to the third party 3RD, in other words here, a contact information from the software control gateway 5(3RD). This contact information can be of different nature, but it allows direct or indirect access to the software control gateway 5(3RD). Thus, it may for example be a reachability address @5(3RD) of the software control gateway 5(3RD) such as a URL (Uniform Resource Locator) or a pointer to this gateway. It may also be a variant of an identifier denoted IDSLI(3RD) of the network slice SLI(3RD) allocated by the operator OP to the third party 3RD and access to which is controlled by the software control gateway, this identifier being associated at the datacenter 3, and more particularly at the access point 6, with the reachability address @5(3RD) of the control gateway 5(3RD) associated with the third party 3RD; and a sending module 4C, configured to send a message to the communication device 2 containing the contact information (@5(3RD) or IDSLI(3RD)) and inviting the communication device 2 to attach to the Software Control Gateway 5(3RD) using this contact information.

The functions of modules 4A to 4C are described in more detail later with reference to the steps of the management method according to the invention.

Figure 3:
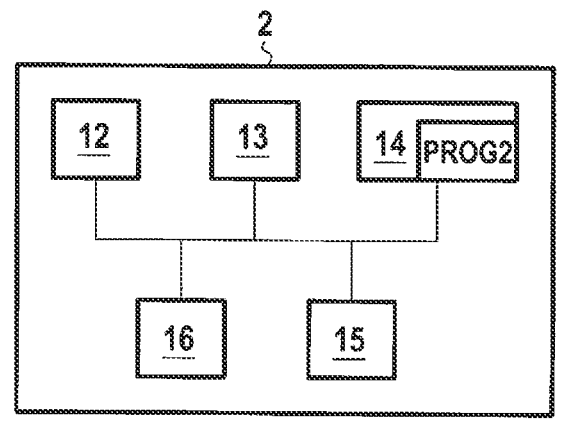

Similarly, in the embodiment described herein, the communication device 2 has the hardware architecture of a computer as shown in FIG. 3.

In particular, it comprises a processor 12, a random access memory 13, a read only memory 14, a non-volatile flash memory 15, as well as communication means 16 allowing it to communicate with the pieces of equipment of the network NW via the access point 6.

In the embodiment described herein, the read only memory 14 of the communication device 2 constitutes a recording medium according to the invention, readable by the processor 12 and on which is recorded a computer program PROG2 in accordance with the invention, including instructions for the execution of the steps of the access method according to the invention.

This computer program PROG2 defines here functional and software modules of the communication device 2 which use or rely on the hardware elements 12-16 of the communication device 2 mentioned above. These modules comprise in particular, as illustrated in FIG. 1:

a first request module 2A, configured to request an attachment to the operator OP network NW in order to benefit from the network connectivity provided by the third party 3RD via the network NW, this first request module 2A being configured to provide an identifier ID(3RD) of the third party (3RD);

a reception module 2B, capable of receiving from the software network entity 4 a message containing contact information from the instantiated software control gateway 5(3RD) for controlling access to the slice SLI(3RD) of the network NW allocated by the operator OP to the third party 3RD, this contact information comprising, as indicated previously, the reachability address @5(3RD) of the software control gateway 5(3RD) or the identifier IDSLI(3RD) of the network slice SLI(3RD) access to which is controlled by the software control gateway 5(3RD). In accordance with the invention, this message invites the communication device 2 to attach to the software control gateway 5(3RD);

a second request module 2C, configured to request an attachment to the software control gateway 5(3RD) using the received contact information;

an authentication module 2D (optional), configured to authenticate the communication device 2 with the software control gateway 5(3RD); and an access module 2E configured to access the slice SLI (3RD) of the operator OP network NW and thus provide the communication device 2 with network connectivity via this slice SLI(3RD) of the network NW.

The functions of modules 2A to 2E are described in more detail now with reference to the steps of the access method according to the invention.

Figure 4:
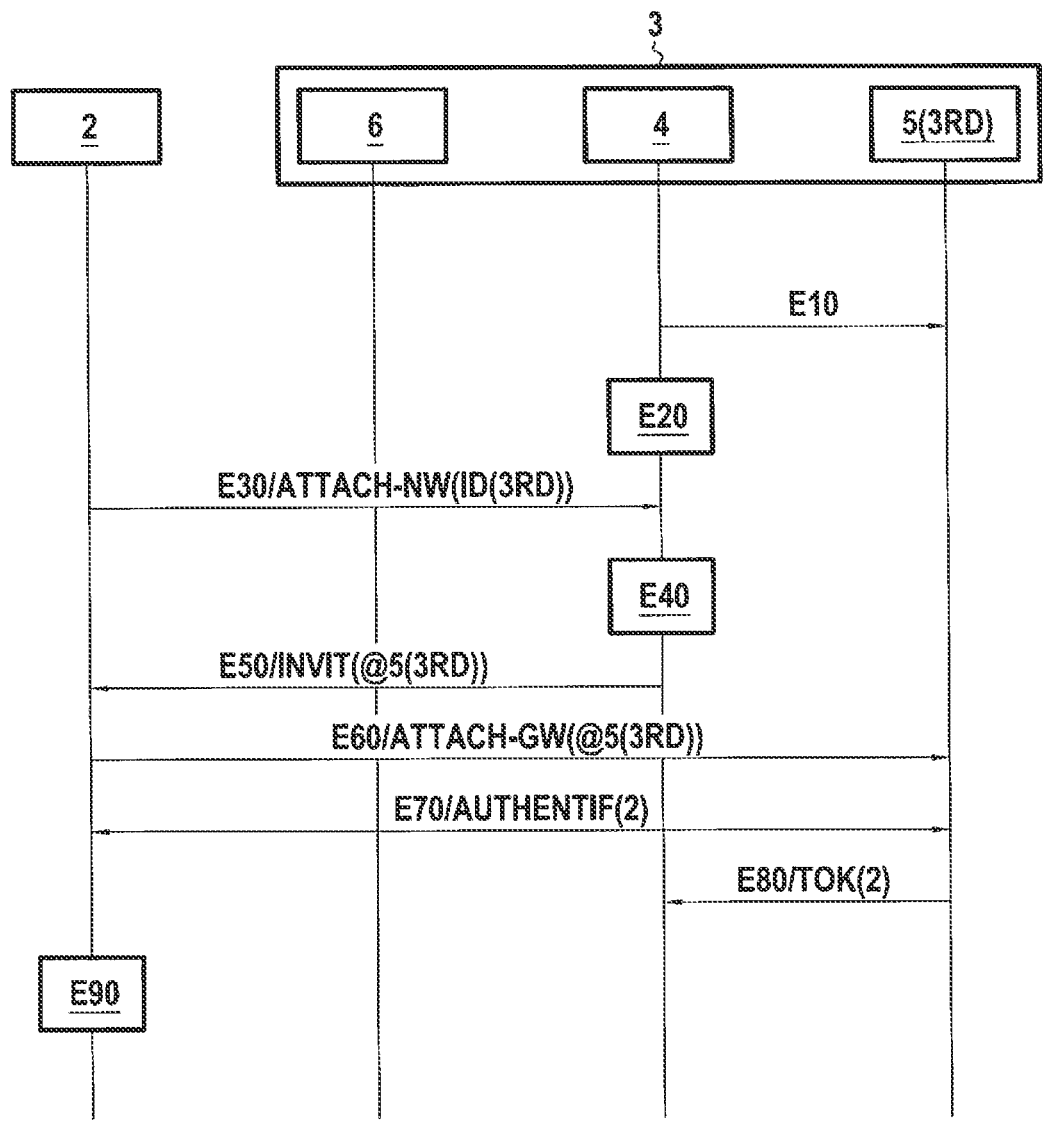
FIG. 4 shows the main steps of a management method and an access method according to the invention in a particular embodiment.

FIG. 4 shows, in diagram form, the main steps of a management method and the main steps of an access method as implemented respectively, in a first embodiment, by the software network entity 4 and by the communication device 2.

In the embodiment shown in FIG. 4, it is assumed that during a preliminary step following the allocation of the virtual network slice SLI(3RD) by the operator OP of the network NW to the third party 3RD, the control gateway 5(3RD) is instantiated in the proximity datacenter 3 (step E10). This instantiation is carried out, in the embodiment described herein, by the software network entity 4 to which the identifier ID(3RD) of the third party 3RD is provided (in encrypted form or not), and which instantiates (that is to say creates) a software module (this software module being, in the embodiment described herein, a virtual machine or any other container) for executing a computer code defining the access control mechanism intended to be applied to control the access to the network slice SLI(3RD). It is assumed that this mechanism has been selected or predefined by the third party 3RD (in agreement with the operator OP) and encoded in the form of a computer code used by the software network entity 4 to instantiate the gateway 5(3RD). This computer code is available for example in a library of third-party software network functions (virtual network functions in the embodiment described herein), in association with the identifier ID(3RD) of the third party 3RD. This library of functions can be stored at the datacenter 3 or in another datacenter (for example in a centralized datacenter as described previously located in the network NW).

Alternatively, the gateway 5(3RD) can be instantiated by an entity other than the software network entity 4, such as for example by a function for managing software network functions instantiated in the datacenter 3 and as described in the MANO (NFV Management and Orchestration) project proposed by ETSI. At the end of the instantiation of the gateway 5(3RD), the identifier ID(3RD) is provided to the software network entity 4.

Following the instantiation of the gateway 5(3RD), the software network entity 4 memorizes in a table contained for example in its non-volatile memory 10, the identifier ID(3RD) of the third party 3RD in association with contact information of the newly instantiated gateway 5(3RD) (step E20). In the embodiment described herein, this contact information is a reachability address @5(3RD) of the gateway 5(3RD) such as a URL or a pointer to the software module instantiating the gateway 5(3RD).

Alternatively, this contact information can be the identifier IDSLI(3RD) of the network slice SLI(3RD) allocated to the third party 3RD by the operator OP.

It is now assumed that the communication device 2 wishes to attach to the network NW in order to benefit from the network connectivity offered (and managed) by the third party 3RD. In a manner known per se, the attachment of a communication device to a network designates the procedure which conventionally allows the device to establish an initial connection with a point of access to this network (for example after a shutdown of the device, etc.). Such a procedure can comprise, for example, authenticating the communication device, retrieving its service profile (and its rights), recording the location of the device to allow data to be routed to this device, etc.

To this end, the communication device 2 sends via its first request module 2A and the access point 6, a request for attachment to the network NW designated by ATTACH-NW (step E30). This attachment request here contains the identifier ID(3RD) of the third party 3RD providing it with the network connectivity, and is received or intercepted by the software network entity 4 via its receiving module 4A. The identifier ID(3RD) can be provided unencrypted or encrypted in the attachment request addressed to the network NW.

Alternatively, the identifier ID(3RD) can be provided to the software network entity 4 not directly in the attachment request ATTACH-NW, but during an exchange established between the software network entity 4 and the communication device 2 after receiving the attachment request ATTACH-NW by the software network entity 4. For example, the identifier ID(3RD) may be the subject of a challenge or a random challenge implemented between the software network entity 4 and the communication device 2 from an embedded cryptographic equipment (for example by the third party 3RD if the latter is the manufacturer of the communication device 2 in particular) in the communication device 2 and previously provided by the third party 3RD to the software network entity 4.

By using the identifier ID(3RD) of the third party contained in the attachment request, the software network entity 4 obtains, by means of its obtaining module 4B, the contact information of the instantiated control gateway 5(3RD) for controlling access to the network slice SLI(3RD) allocated to the third party 3RD (step E40). This contact information is in the embodiment described herein, the address @5(3RD) memorized in its non-volatile memory 10 in association with the identifier ID(3RD).

Note that the software network entity 4 can re-route the attachment request ATTACH-NW to the control gateway 5(3RD) to perform additional checks, and for example perform a first level of access control (based for example on a list of MAC addresses authorized by the control gateway 5(3RD) and communicated to the network entity 4, etc.). If this first level of access control is positive for the communication device 2, the network entity 4 can provide it with a token that it will subsequently use as proof of this prior authorization with the control gateway 5(3RD). This allows to filter attachment requests.

Then, the software network entity 4, through its sending module 4C, sends as a response to the attachment request ATTACH-NW a message denoted INVIT containing the contact information @5(3RD) of the control gateway 5(3RD) and inviting the communication device 2 to attach to the control gateway 5(3RD) (that is to say in particular to establish a connection with the latter and to authenticate therewith) by using the transmitted contact information (step E50).

Alternatively, as mentioned previously, the contact information of the gateway 5(3RD) obtained by the software network entity 4 can be the identifier IDSLI(3RD) of the network slice SLI(3RD) allocated to the third party 3RD and on which the software entity 4 invites the communication device 2 to connect in order to attach to the control gateway 5(3RD) which manages and controls access to this network slice.

Upon reception of the message INVIT via its receiving module 2B, the communication device 2, via its second request module 2C, sends an attachment request denoted ATTACH-GW to the control gateway 5(3RD) using the reachability address @5(3RD) (step E60). This attachment request passes through the access point 6; thus, to allow the attachment request intended for the control gateway 5(3RD) to be correctly routed by the access point 6 to the latter, the second request module 2C of the communication device 2 can include in the attachment request the address @5(3RD) allowing the access point 6 to identify the entity to be contacted.

Alternatively, if the contact information received by the communication device 2 is the identifier IDSLI(3RD) of the virtual network slice allocated to the third party 3RD, the second request module 2C of the communication device 2 can include in the attachment request the identifier IDSLI (3RD), which is then used by the access point 6 to determine the address @5(3RD) of the entity to be contacted. To this end, the access point 6 may have been previously configured by default with the address @5(3RD) of the control gateway 5(3RD) associated with the third party 3RD and instantiated to control the access to the network slice identified by IDSLI(3RD). This default configuration is for example made so that the access point 6 addresses all the messages conveyed on the network slice identified by IDSLI(3RD) to the gateway in question.

In the embodiment described herein, upon reception of the attachment request ATTACH-GW, the control gateway 5(3RD) initiates an authentication session with the communication device 2 in order to authenticate the latter (step E70). No limitation is attached to the means implemented during this authentication session to authenticate the communication device 2. Thus, for example, the authentication of the communication device can be done via the exchange of a login and a password, or via an asymmetric or symmetric cryptographic mechanism. The authentication mechanisms to be used may have been agreed beforehand between the communication device 2 and the third party 3RD (for example when designing the communication device 2 or its firmware), or be selected dynamically by negotiation between the communication device 2 and the control gateway 5(3RD). In other words, thanks to the invention, in particular via the instantiated control gateway for the third party 3RD, the latter can define its own authentication mechanisms (without going through the network operator).

Alternatively, no authentication mechanism of the communication device 2 is implemented by the control gateway.

In a particular embodiment, if the authentication of the communication device 2 is positive, the control gateway 5(3RD) generates a token TOK(2) containing the access control rules defined by the third party 3RD and with which the communication device 2 must comply, for example in terms of throughput limit, period of validity of the authorization, etc. (step E80). Such a token containing the access rights of the communication device 2 can for example be generated in JWT (JSON Web Token) format, and/or be signed by the control gateway 5(3RD) in order to guarantee its origin.

The token TOK(2) generated by the control gateway 5(3RD) can be sent by the latter to the communication device 2, which in turn transmits it to the software network entity 4 when the network entity 4 wishes to check the access rights of the communication device 2.

Alternatively, the token TOK(2) generated by the control gateway 5(3RD) can be provided directly by the control gateway 5(3RD) to the software network entity 4 or to any other entity of the network slice SLI(3RD) which needs at one time or another to control the access rights of the communication device 2.

The communication device 2 can therefore access, via its access module 2E, the network slice SLI(3RD) dedicated to the third party 3RD and benefit from a network connectivity via the network NW (step E90). The software network entity 4, upon reception of messages intended for or emitted by the communication device 2 can check, thanks to the content of the token TOK(2), whether these messages satisfy the access control rules defined by the third party 3RD and with which the communication device 2 must comply.

In another variant, the control gateway 5(3RD) does not generate a token TOK(2) but configures an interface of the software network entity 4 or of the access point 6 with the access control rules with which the communication device 2 must comply or more generally with the access rights of the communication device 2.

In another variant, all the messages emitted by the communication device 2 can pass through the control gateway 5(3RD), which in addition to an access control function, can ensure a routing function for these messages. In particular, they can be sent directly by the gateway to a network managed by the third party 3RD. This network can be of any nature, such as for example an Ethernet network (in which case the gateway 5(3RD) acts as an Ethernet switch on this network).

In the first embodiment which has just been described, the control gateway 5(3RD) is instantiated during a prior step E10, even before an attachment request is sent thereto by a communication device managed by the third party 3RD.

In a second embodiment, the control gateway 5(3RD) can be instantiated dynamically after, for example, the reception of the first request for attachment of a communication device 2 managed by the third party 3RD. In this embodiment (which does not comprise prior to step E30, the steps E10 and E20 illustrated in FIG. 4), after the reception of the attachment request ATTACH-NW from the communication device 2 containing the identifier ID(3RD) of the third party 3RD, the software network entity 4 checks whether the identifier ID(3RD) of the third party 3RD is associated in its non-volatile memory 10 with contact information of an access control gateway (reachability address or network slice identifier).

If this is the case, it means that an access control gateway 5(3RD) has already been instantiated for the network slice SLI(3RD) and the third party 3RD. Steps E40 to E90 are then carried out identically to what has been described previously with reference to FIG. 4 and to the first embodiment.

Otherwise, in the second embodiment described herein, the software network entity 4 queries a library of third-party network functions to obtain a computer code associated with the identifier ID(3RD), and defining the access control function intended to be implemented by the access control gateway 5(3RD) to control the access to the network slice SLI(3RD). This library can be located either within the datacenter 3 as described above, or in a centralized datacenter located in the network NW for example.

The computer code corresponding to the identifier ID(3RD) is sent by the library to the software network entity 4.

Upon reception of this computer code, the software network entity pilots the instantiation of access control gateway 5(3RD). More specifically, it instantiates (i.e. creates) a software module (such as a virtual machine or any other container in the embodiment described herein) to execute the computer code obtained from the library of network functions.

Alternatively, the gateway 5(3RD) can be instantiated by an entity other than the software network entity 4, such as for example by a function for managing software network functions instantiated in the datacenter 3 and as described in the MANO (NFV Management and Orchestration) project proposed by ETSI. At the end of the instantiation of the gateway 5(3RD), the identifier ID(3RD) is provided to the software network entity 4.

The steps E20 and E40 to E90 are then implemented in a manner similar to what has been described previously for the first embodiment.

Although the present disclosure has been described with reference to one or more examples, workers skilled in the art will recognize that changes may be made in form and detail without departing from the scope of the disclosure and/or the appended claims.

The invention claimed is:

1. A method implemented by a management device and comprising:
   managing an attachment of a communication device to an operator network, in order to benefit from a network connectivity provided by a third party via the operator network, said managing comprising:
   receiving, from the communication device, a request for attachment to the operator network and an identifier of the third party;
   obtaining, using the identifier of the third party, contact information of a software control gateway that controls access to a network slice allocated by the operator to the third party, the contact information comprising a reachability address of the software control gateway or an identifier of the network slice allocated to the third party and access to which is controlled by the software control gateway; and
   sending a message to the device containing the contact information and inviting the communication device to attach to the software control gateway using the contact information.

2. The management method according to claim 1, wherein the method is implemented without prior authentication of the communication device with the operator network.

3. The management method according to claim 1 wherein the identifier of the third party is provided in the request for attachment to the operator network.

4. The management method according to claim 1 wherein the software control gateway is instantiated dynamically, after receiving the attachment request from the communication device, to execute a computer code implementing a function defined by the third party to control access to the network slice allocated by the operator to the third party, this computer code being obtained by interrogating a library of software network functions by means of the identifier of the third party.

5. The management method according to claim 1, comprising:
- a preliminary act of instantiating the software control gateway to execute a computer code implementing a function defined by the third party to control access to the network slice allocated by the operator to the third party; and
- memorizing, in a database, an identifier of the third party in association with a reachability address of the instantiated software control gateway or with an identifier of the network slice allocated by the operator to the third party.

6. The management method according to claim 1 wherein the method is implemented by a software network entity of the management device hosted in a datacenter called proximity datacenter located in an access network used by the communication device to access the operator network, the proximity datacenter also hosting the software control gateway.

7. The management method according to claim 6 wherein the proximity datacenter is located in an access point of the access network.

8. A non-transitory computer-readable medium comprising instructions stored thereon which when executed by a processor of a device configure the device to manage an attachment of a communication device to an operator network, in order to benefit from a network connectivity provided by a third party via the operator network, by:
- receiving, from the communication device, a request for attachment to the operator network and an identifier of the third party;
- obtaining, using the identifier of the third party, contact information of a software control gateway that controls access to a network slice allocated by the operator to the third party, the contact information comprising a reachability address of the software control gateway or an identifier of the network slice allocated to the third party and access to which is controlled by the software control gateway; and
- sending a message to the device containing the contact information and inviting the communication device to attach to the software control gateway using the contact information.

9. A device comprising:
a processor; and
a non-transitory computer-readable medium comprising instructions stored thereon which when executed by the processor configure the device to manage attachment of at least one communication device to an operator network in order to benefit from a network connectivity provided by a third party via the operator network, by:
receiving from said communication device a request for attachment to the operator network and an identifier of the third party;
obtaining, using the identifier of the third party, contact information from a software control gateway that controls access to a network slice allocated by the operator to the third party, the contact information comprising a reachability address of the software control gateway or an identifier of the network slice allocated by the operator to the third party and access to which is controlled by the software control gateway; and
sending a message to the communication device containing the contact information and inviting the communication device to attach to the software control gateway using the contact information.

* * * * *